United States Patent [19]

Noffke

[11] Patent Number: 4,474,357

[45] Date of Patent: Oct. 2, 1984

[54] VALVE CONTROL LINKAGE

[75] Inventor: Tim J. Noffke, Larsen, Wis.

[73] Assignee: Ingersoll Equipment Co., Inc., Winneconne, Wis.

[21] Appl. No.: 400,734

[22] Filed: Jul. 22, 1982

[51] Int. Cl.³ .................... F16K 31/44; G05G 1/04
[52] U.S. Cl. ..................................... 251/233; 74/518; 74/522
[58] Field of Search ............ 74/516, 518, 522, 480 R, 74/491; 251/233

[56] References Cited

U.S. PATENT DOCUMENTS

| | | | |
|---|---|---|---|
| 1,926,634 | 9/1933 | See et al. | 74/516 |
| 2,076,965 | 4/1937 | Sawtelle | 74/518 |
| 3,626,784 | 12/1971 | Johnson | 74/518 |
| 3,645,368 | 2/1972 | Blaauw | 251/289 |
| 3,727,481 | 4/1973 | Nicholson | 251/233 |
| 3,732,749 | 5/1973 | Thatcher et al. | 251/233 |
| 3,988,945 | 11/1976 | Fasano | 74/518 |
| 4,149,433 | 4/1979 | Schröter | 74/518 |
| 4,365,785 | 12/1982 | Miller | 74/522 |

FOREIGN PATENT DOCUMENTS 704801 3/1954 United Kingdom .............. 714/516

*Primary Examiner*—A. Michael Chambers
*Attorney, Agent, or Firm*—Dressler, Goldsmith, Shore, Sutker & Milnamow, Ltd.

[57] ABSTRACT

A valve control linkage is disclosed which provides a variable rate of relative motion between a valve spool and a control lever. The relative rate of valve spool displacement with respect to the lever motion is lowest adjacent the neutral position of the lever.

4 Claims, 9 Drawing Figures

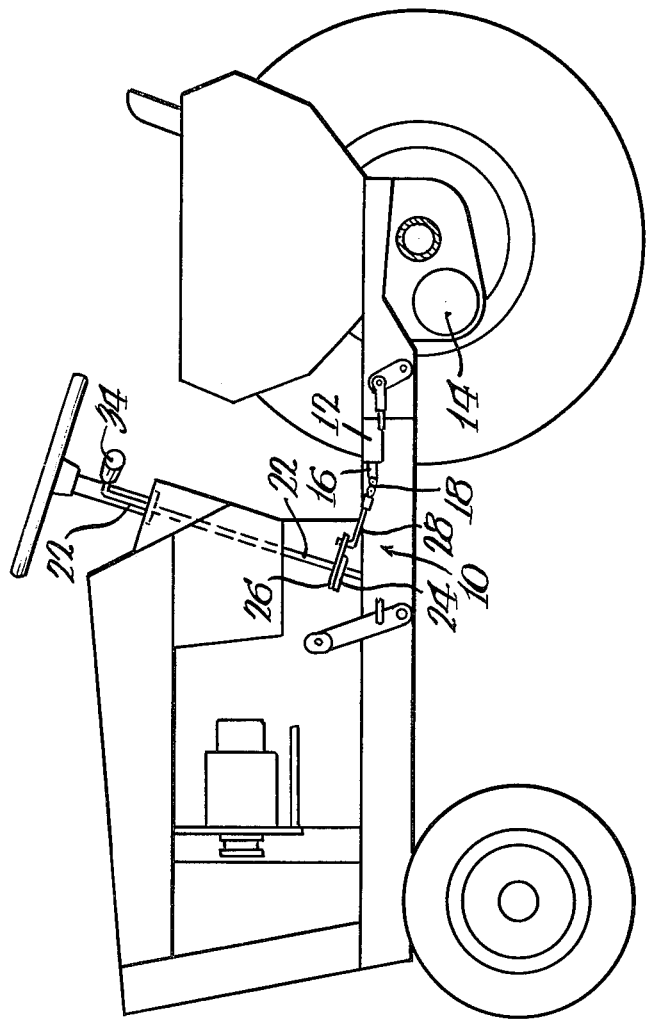

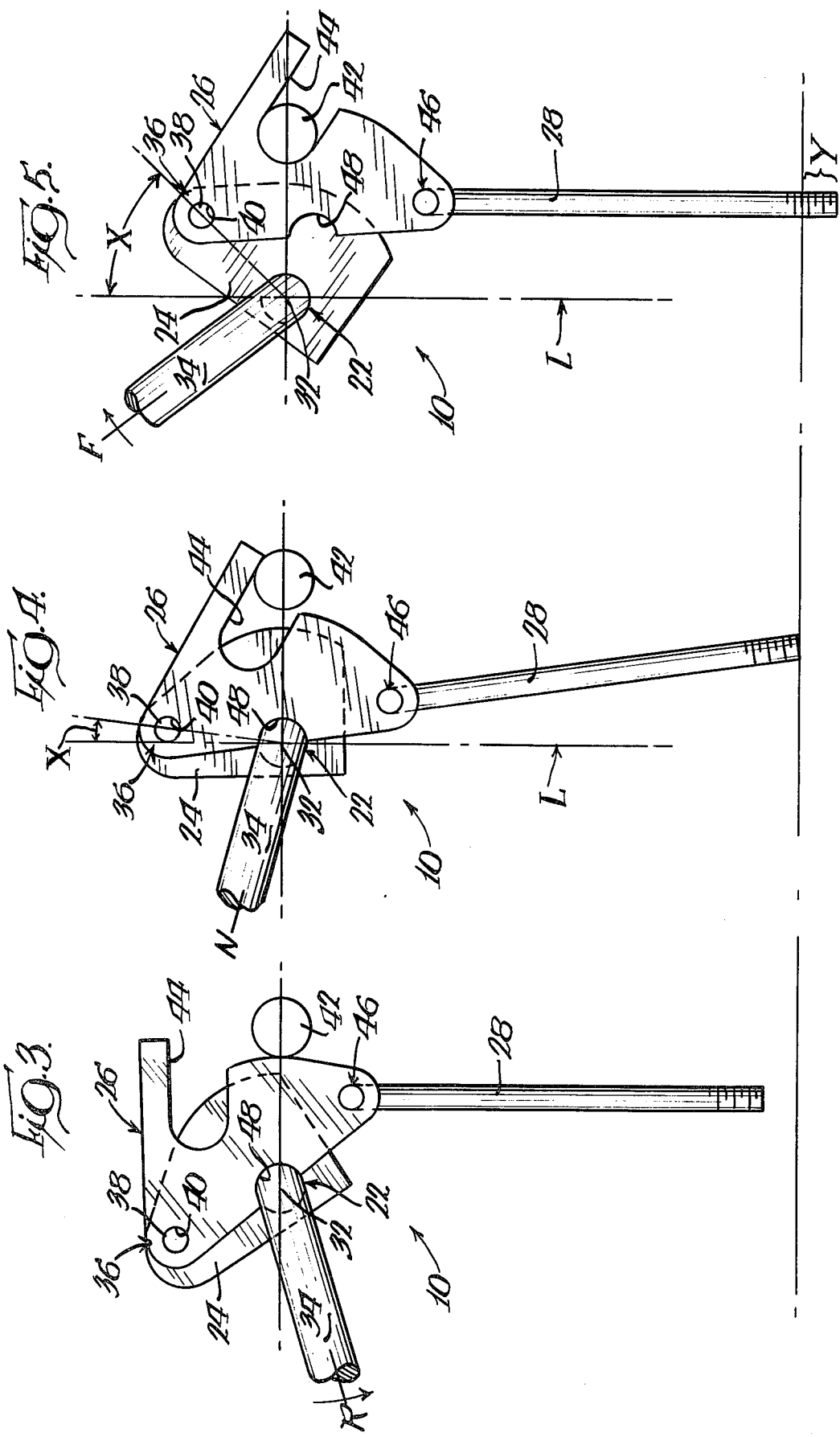

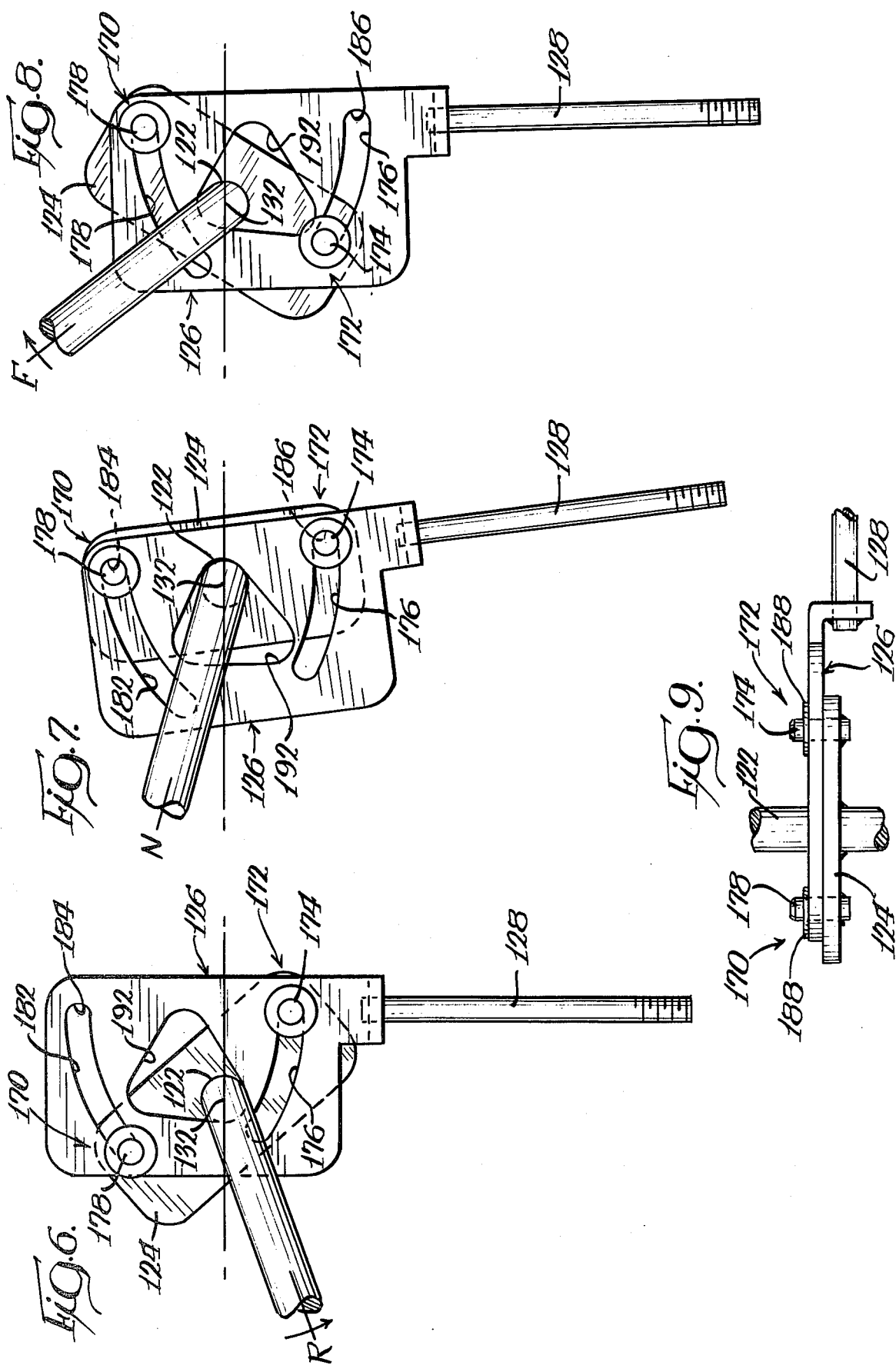

VALVE CONTROL LINKAGE

Technical Field of the Invention

The present invention relates to control linkages and, more particularly to linkages for use with hydraulic valves.

BACKGROUND OF THE INVENTION

Many types of earth handling equipment are provided with valve-controlled hydraulic systems for operating implements and drive motors. As an example, the speed and direction of some tractors is controlled by the flow of hydraulic fluid through a hydraulic motor connected to the wheels. Usually a control lever is connected with a valve having two operating positions, such as forward and reverse opposite each other from a center neutral position. As the lever is moved from its neutral position, the valve spool is moved from its neutral position into one of the operating positions. Hydraulic fluid then flows through the valve energizing the motor to move the tractor in the chosen direction.

Unfortunately, many prior control linkages operate the valve spool to quickly energize the motor. With a tractor this can often result in a jerky start or a loss of traction. This is because there is a significant amount of valve spool displacement as the lever is initially moved from its neutral position. A relatively large amount of fluid flows quickly through the valve and the hydraulic motor is then quickly energized, causing the jerky start.

Each unit of lever movement of the lever from its neutral position causes a relatively large amount of initial valve spool displacement from its neutral position. Generally where the lever is rotated x degrees from its neutral position, the valve spool is displaced at a relative rate which is a function of the cosine of x. Thus, the greatest relative rate of valve spool displacement takes place initially during relatively small amounts of lever rotation, i.e. small values of x, when the motor is first being energized. Increasing the total movement of the lever can reduce the initial high rate of valve spool displacement, but results in an unwieldy amount of total lever movement.

As the control lever is first moved, the valve should at first be displaced slowly from its neutral position to provide better control. An initial slow rate of valve spool movement relative to the rate of control lever movement would slowly energize the motor or other valve-controlled device. A faster rate of relative valve spool displacement away from the lever neutral position would allow the valve to be fully opened without excessive total lever movement.

It would be desirable to provide a valve control linkage which avoids the deficiencies of the prior art to provide more effective valve operation. Each unit of initial control lever motion from its neutral position should displace the valve spool relatively less than each unit lever motion in its operating positions. This would provide more controlled initial operation of the hydraulic system. It would also be desirable if the valve control linkage did not require excessive total lever movement. The valve control linkage of the present invention meets these desires.

SUMMARY OF THE INVENTION

The present invention is a valve control linkage for operating a valve such that the relative rate of valve spool displacement varies. The valve has a valve spool having first and second operating positions opposite with respect to a central neutral position. For ease of description the first operating position and the first direction will be referred to as forward and the forward direction, and the second position and direction will be referred to as reverse. The terms forward and reverse are arbitrary and can be switched or other terms used as desired.

The control linkage has a lever movable toward a first and a second operating position, forward and reverse, opposite with respect to a neutral position. Linking means is provided for operatively connecting the lever with the valve spool such that the valve spool is in its neutral position when the lever is in its neutral position. The linking means operates to displace the valve spool to each of its operating positions as the lever is moved into its respective operating positions.

Each unit of initial lever motion adjacent its neutral position displaces the valve spool less than each like unit of lever motion in its operating positions. Stated another way, as the lever is moved from neutral toward an operating position, the valve spool is initially displaced at a slower relative rate. As the lever moves further into the operating position, the valve spool travels relatively faster. As an example, the first 5 degrees of lever movement from neutral in the forward direction will displace the valve spool about 0.32 millimeters in the forward direction, while the same 5 degree movement further in the forward operating position, say from 35 degrees to 40 degrees, will displace the valve spool a distance of about 4.5 millimeters. Therefore, an initial relatively slow rate of relative valve displacement with respect to the lever motion is provided followed by a relatively faster rate.

Often in prior devices, the relative rate of valve displacement decreased as the lever was moved further into its operating positions. There was less valve spool movement for each unit of lever movement when the lever was near the end of one of its operating positions. This is exactly opposite of what is desirable.

The relatively small initial rate of valve spool displacement of the present invention ensures that the valve is slowly opened and that the hydraulic unit being controlled, such as a hydraulic drive motor, is slowly energized. The tractor or like device therefore begins its movement slowly and under greater control without an initial jerking motion or a loss of traction. Subsequent lever movement displaces the valve spool at a higher rate so the valve can be placed in its full operating position without requiring large total lever motion.

The present invention provides fine control over the valve spool displacement from its neutral position without a large total lever motion to the full forward or reverse position. The present invention accomplishes this variable rate of valve spool displacement with a minimum number of parts. The relatively straight forward nature of the parts used and their interconnection provides reliable and effective operation.

Numerous other features and advantages of the present invention will become readily apparent from the following detailed description of the preferred embodiments of the invention, the drawings, and the appended claims.

BRIEF DESCRIPTION OF THE DRAWINGS

FIG. 1 is a side elevational view showing a valve control linkage embodying the present invention mounted on a tractor;

FIG. 2 is a graphic representation of the variable rate of valve spool displacement;

FIGS. 3-5 are top plan views of the valve control linkage of FIG. 1 shown in reverse, neutral, and forward positions, respectively;

FIGS. 6-8 are top plan views of alternative embodiment for the valve control linkage shown in reverse, neutral, and forward positions, respectively; and FIG. 9 is a side elevational view of the valve control linkage embodied in FIGS. 6-8.

DETAILED DESCRIPTION OF THE PREFERRED EMBODIMENTS

While this invention can be embodied in many different forms, there are shown in the drawings and described in detail, preferred embodiments of the invention. The present disclosure is to be considered as an exemplification of the principles of the invention and is not intended to limit the invention to the embodiments illustrated.

Referring to FIG. 1, a valve control linkage 10 embodying the present invention is shown mounted on a tractor. A valve 12 controls the flow of hydraulic fluid to a hydraulic motor 14 which powers the rear wheels. The valve 12 includes a valve spool 16 having first and second (forward and reverse) operating positions opposite with respect to a central neutral position. The valve acts to meter hydraulic fluid flow by increasing flow as displacement of the valve spool from its neutral position increases. The valve spool 16 preferably reciprocates, and as shown in FIG. 1 is connected to the control linkage by a ball joint 18.

Referring also to FIGS. 3-5, the valve control linkage 10 includes a lever 22 movably mounted relative to the valve and having two operating positions, reverse (FIG. 3) and forward (FIG. 5) opposite with respect to a central neutral position (FIG. 4). The lever is preferably rotatably mounted distally of the valve 12. For ease of description the terms proximally and distally will be used to denote relative position with respect to the valve. Distally refers to a relative position away from the valve and proximally refers to a relative position closer to the valve.

The control linkage also includes a linking means for operably associating the lever and valve spool. The linking means preferably includes an arm 24 mounted as by being fixed on the lever 22. A plate 26 is also preferably provided and operably associated or connected as by connecting means including link member 28 with the valve spool 16. The connecting means interrelates the arm 24, plate 26 and valve spool such that the valve spool is in its neutral position when the lever is in its neutral position. The connecting means displaces the valve spool toward each of its operating positions (e.g. forward) as the lever is moved into its respective operating position (e.g. forward).

Thus, as the lever is moved from its neutral position as shown in FIG. 4 in a first or forward direction to a full forward operating position as shown in FIG. 5, the link member 28 drives the valve spool into its forward drive position, i.e. into the valve, and the tractor moves forward. As the lever is moved in a second or reverse direction toward its full reverse operating position as shown in FIG. 3, the valve spool is moved into its reverse position, i.e. pulled away from the valve and the tractor backs.up. The use of the terms "forward" and "reverse" are for ease of description and can be interchanged or replaced with other terms as desired.

When the lever 22 initially moves out of its neutral position as shown in FIG. 4, the valve spool is displaced at a slower relative rate than when the lever is moved further toward its fully operative positions as shown in FIGS. 3 and 5. Thus, each unit of initial lever motion from its neutral position displaces the valve spool less than each subsequent unit of lever in at least one, and preferably both of the lever operating positions. This is shown graphically in FIG. 2.

FIG. 2 graphically illustrates the amount of valve spool displacement for each five degrees of rotation from the lever in either direction. As can be seen, the relative movement rate between the lever and valve spool is slow adjacent the neutral position, but increases as the lever approaches the end of its travel. Thus, when the lever is initially moved in either the forward or reverse direction, hydraulic fluid is first slowly supplied to the drive motor providing greater control and a smooth start-up. The relative rate of valve spool displacement with respect to the lever rotation is a function of sine x where x is the angle of lever rotation from its neutral position. This is described in more detail below.

Referring again to FIGS. 3-5, the arm 24 pivots about an arm axis 32 as it is moved by the lever. As shown, the lever 22 is rotatably mounted with the arm fixed on the lever and, therefore, the lever axis coincides with the arm axis 32. The lever 22 preferably extends perpendicularly through the arm 24 and includes a cantilevered portion 34 to provide ease of operation at a distance remote from the rest of the linkage and valve. Alternatively, the lever can be attached to the arm other than perpendicularly and can even be unitary with the arm and move in the same plane as the arm.

As shown in FIGS. 3-5, the connecting means includes a distal pivot means 36 such as distal pivot pin 38 between the arm 24 and the plate 26 spaced from the arm or lever axis 32. The distal pivot pin 38 can be mounted on either the arm or the plate, but as shown is fixed on the arm 24 and extends through opening or aperture 40 defined by the plate.

In the embodiment of FIGS. 3-5 the connecting means also includes cam means such as fixed cam follower 42 and camming slot 44 for substantially preventing the rotation of the plate 26 as the lever moves toward the forward operating position (FIG. 5). As shown, the cam follower 42 is the steering post of the tractor. The connecting means also includes the rigid link member 28 pivotably mounted on the plate 26 by proximal pivot means 46 proximally of the arm axis 32 with respect to the valve.

As the lever 22 moves toward its reverse operating position (FIG. 3) from the neutral position, the plate 26 remains substantially fixed relative to the arm 24 and the plate pivots with respect to the link member 28 to drive the valve spool into its reverse operating position. The lever is received in a recess 48 in one side of the plate 26 when in the neutral position or when moving into the reverse position as shown in FIGS. 3 and 4.

The mounting positions for the proximal and distal pivot means are judged as being proximally and distally with respect to the arm or lever axis 32 when the lever and arm are in the neutral position as shown in FIG. 4. Preferably when in the neutral position, the distal pivot means 36 is at its furthest from the valve and the proximal pivot means 46 is at its closest to the valve. When in the neutral position, the proximal and distal pivot means together with the arm or lever axis should be generally aligned with the traveling axis of valve spool motion.

As the lever 22 is initially rotated, as toward the forward position, FIG. 4 to FIG. 5, the valve spool displacement is initially only a small amount. The relative rate of valve spool displacement increases as the distal pivot pin 36 approaches the full forward position shown in FIG. 5.

The operation of the valve control linkage can be understood by considering an imaginary line L parallel to the axis of the valve spool motion and passing through the lever or arm axis 32. The displacement of the pivot means such as distal pivot pin 38 with respect to this line can be measured by angle x. The same angle x can measure the amount of lever rotation from its neutral position. When x is zero or small as in FIG. 4, a unit increase in x causes a relatively small displacement along the link member 28 to the valve spool 16. When x is larger, a unit increase in x causes a larger increase in valve spool displacement. As can be seen, the total amount of valve spool displacement, y, is a function of 1-cos x and is at its greatest as x approaches ninety degrees. The relative rate of change of displacement, the change of displacement, y, with respect to the change in angle, x, by simple calculus is a function of sin x. This is graphically shown in FIG. 2. The angle of x need not be zero in the neutral position, but should be relatively small, either negative or positive, and increase toward ninety degrees as lever moves into one of its operating positions.

The present invention utilizes this geometrical relation to provide greater control at start-up without undue total lever motion to place the valve in one of its full open operating positions. The control linkage of the present invention allows the advantagous use of this relationship for both forward and reverse. A different pivot means is used for each of forward and reverse. The relative rate of valve spool displacement being a function of sin x gives a slow start up and faster relative displacement as x increases. This is a considerable improvement over prior systems which operate as a function of cos x and result in an undesirable fast rate of displacement at start-up. The control linkage with the valve operates as a selectively variable throttle control.

An alternative embodiment for the valve control linkage is shown in FIGS. 6-9. As before, this control linkage has the arm 124 fixed on the lever 122 which rotate together about the lever or arm axis 132. However, the connecting means of this embodiment differs.

The connecting means includes distal pivot means 170 for associating the plate 126 and the arm 124 distally of the arm axis such that as the lever moves from its neutral position, FIG. 7, in the forward direction, FIG. 8, the arm 124 and the plate 126 pivot with respect to each other about the distal pivot means 170 driving the valve spool through link 128 from its neutral position toward the forward operating position.

The connecting means also includes proximal pivot means 172 associating the plate 126 and arm 124 proximally of the lever axis 132 such that as the lever is rotated from its neutral position, FIG. 7, in a reverse direction, FIG. 6, the arm and plate pivot with respect to each other about the proximal pivot means driving the valve spool from its neutral position toward its reverse position.

The proximal pivot means 172 preferably includes a proximal pin 174 mounted proximally on the arm and extending through an opening such as arcuate proximal slot 176 defined by the plate 126. Similarly, the distal pivot means preferably includes a distal pin 178 mounted distally on the arm 124 and extending into an opening such as arcuate distal slot 182 defined by the plate 126. Alternatively, the slots can be on the arm and the pins on the plate. The plate 126 is linked to the valve spool as by link member 128.

The arcuate distal slot 182 has a distal neutral abutment end 184 and the proximal slot 176 also has a proximal neutral abutment end 186. The distal pin 178 and proximal pin 174 are adjacent the neutral abutment ends 184, 186 when the lever is in its neutral position. The distal pin 178 remains against the distal neutral abutment end 184 as the lever is rotated in the forward direction, FIG. 8. The proximal pin 174 remains adjacent the proximal neutral abutment end 186 as the lever is rotated in the reverse direction, FIG. 6.

The radius of each arcuate slot 176, 182 is preferably taken from the center of the opposing pin 178, 174, respectively. Thus, the radius of the proximal slot 176 is taken from the center of the distal pin 178. The angular operation of the proximal and distal pivot means of this embodiment perform the same functions and provide the same advantages including the variable rate of valve spool displacement as in the previous embodiment.

As shown in FIG. 9, the distal pin 178 and proximal pin 174 can be fastened as by welding to the arm 124 and pass completely through the plate 126. The pins can be provided with retaining means such as washers 188 to help retain the plate 126 and arm 124 in face-to-face contact. The lever preferably extends through a hole 192 defined by plate 126 to be fixed to the arm 124 below the plate.

The foregoing specification is intended as illustrative and is not to be taken as limiting. Still other variations within the spirit and scope of this invention are possible and will readily present themselves to those skilled in the art.

What is claimed is:

1. A control linkage for use with a hydraulic valve including a reciprocating valve spool having two operating positions opposite with respect to a central neutral position, the control linkage comprising:
   (a) a lever rotatably mounted distally of the valve and having a central neutral position;
   (b) an arm fixed on the lever;
   (c) a plate linked with the valve spool;
   (d) distal pivot means connecting the plate and the arm distally of the lever axis relative to the valve, including a pin mounted distally of the lever axis on the arm and extending into an arcuate distal slot defined by the plate such that as the lever is rotated from its neutral position in a first direction the arm and the plate pivot with respect to each other about the distal pivot means driving the valve spool from its neutral position toward a first operating position; and
   (e) proximal pivot means connecting the plate and the arm proximally of the lever axis relative to the valve and including a pin mounted proximally of the lever axis on the arm and extending into an arcuate slot defined by the plate such that as the lever is rotated from its neutral position in a second direction the arm and the plate pivot with respect to each other about the proximal pivot means driving the valve spool from its neutral position toward a second operating position.

2. The control linkage of claim 1 wherein the slots are defined as each having a neutral abutment end, the pins being respectively adjacent the neutral abutment ends when the lever is in its neutral position, and the distal pin remains adjacent the distal neutral abutment end as the lever is rotated in the first direction and the proximal pin remains adjacent the proximal neutral abutment end as the lever is rotated in second direction.

3. The control linkage of claim 1 wherein the plate is linked to the valve spool by a rigid link member.

4. The control linkage of claim 1 wherein the lever extends through a hole defined by the plate.

* * * * *